H. A. HANNUM.

MILK-COOLERS.

No. 7,853. Reissued Aug. 21, 1877.

WITNESSES:

Joseph H. Lee Lima

Emil Bindseil

INVENTOR:

Henry A. Hannum per E. Laass Atty

N. PETERS, PHOTO-LITHOGRAPHER, WASHINGTON, D. C.

UNITED STATES PATENT OFFICE.

HENRY A. HANNUM, OF CAZENOVIA, NEW YORK.

IMPROVEMENT IN MILK-COOLERS.

Specification forming part of Letters Patent No. 182,436, dated September 19, 1876; Reissue No. 7,853, dated August 21, 1877; application filed July 27, 1877.

*To all whom it may concern:*

Be it known that I, HENRY A. HANNUM, of Cazenovia, in the county of Madison and State of New York, have invented new and useful Improvements in Milk-Coolers, of which the following, taken in connection with the accompanying drawings, is a full, clear, and exact description.

This invention relates to appliances for cooling milk by water circulated around the exterior of the milk-pan, and also has reference to that class of milk-cooling apparatus which are immersed in the milk.

The invention consists, essentially, in a novel arrangement with a milk-pan, set within a tank and having a water-space around its sides and bottom, of a perforated reservoir or pipe extended around the exterior of the milk-pan, at or near the top of all its vertical sides, and a conduit or perforated pipe located centrally underneath the pan, and extended the length of same, by which arrangement the cooling agent is, at its lowest temperature, applied to the top of the pan, uniformly distributed around the sides and bottom of same, and, in its raised temperature, conducted underneath to an exit through the tank. The stratum of milk being thus cooled first at the top, the warmer milk rises from the bottom and causes a gentle circulation of the particles of milk, which circulation greatly facilitates the rising of the cream to the surface of the milk.

It also consists in a novel construction of pipes which are immersed in the milk, by which improvement the said pipes are rendered easily cleaned and strong.

It furthermore consists in a novel construction of a support for pipes immersed in the milk, by which construction the ends of said pipes are braced, and no portion of said support is brought in contact with the milk in the pan, thus saving the labor of cleaning it, and not interfering with the skimming of the milk, all constructed and arranged substantially in the manner hereinafter fully described.

Figure 1:
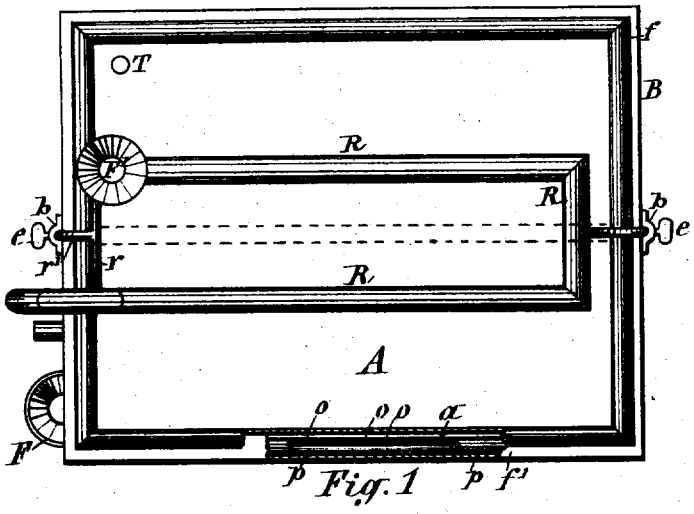
Figure 2:
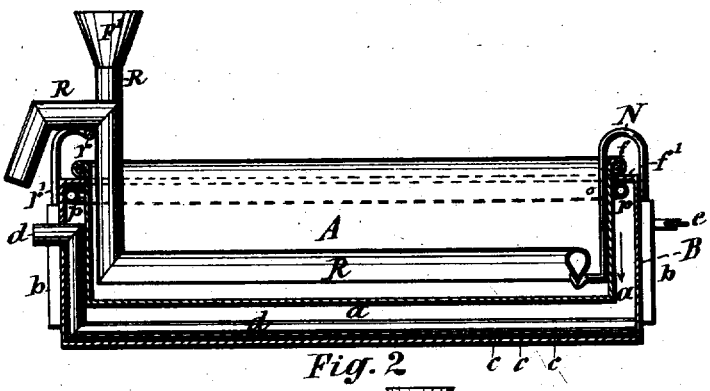
Figure 3:
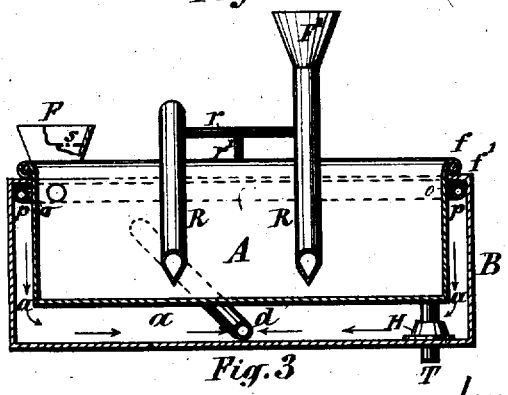

In the accompanying drawings, Figure 1 is a top view of a milk-cooler provided with my improvements, with a portion broken away to show the arrangement of the water-distributing pipe relative to the pan; Fig. 2, a longitudinal vertical section of same; Fig. 3, a transverse vertical section; and Fig. 4 an enlarged transverse section of the pipe which is immersed in the milk.

Similar letters of reference indicate corresponding parts.

A is the milk-pan, set within the tank B, and supported by an outward flange, *f*, around its top, resting on an inward flange, *f'*, on top of the tank in such manner as to form the water-space *a a* between their respective sides and bottoms. *p* is a perforated pipe, having a water-inlet, F, and extended around the exterior of the milk-pan at or near the top of its vertical sides, and completely encompassing the same. It is preferably arranged inside the water-tank, so as to better utilize the cold radiating from its exterior, and to protect it from injury or disturbance, and also save room around the exterior of the tank.

*d* is a conduit or perforated pipe, arranged longitudinally central underneath the milk-pan, and having at one end an obliquely-ascending extension to an exit through the side of the tank, some distance below the pipe *p*. The cooling water being admitted through the inlet F into the pipe *p*, issues through the perforations *o o*, and impinges the top of the pan equally at all sides. The conduit or perforated pipe *d*, being located underneath and arranged centrally the length of the pan, draws through its perforations *c c* the water equally from all sides of the pan, and conveys the same, in its raised temperature, to the exit at its end. Thus, it is obvious that by this novel relative arrangement of the pipes *p* and *d* with the milk-pan, the milk is cooled gradually from the top to the bottom uniformly throughout.

The sizes, forms, and spaces between the perforations in the pipes may be graduated so as to insure the desired effect. The inlet F should be provided with a strainer, *s*, to prevent impurities from entering and clogging the pipes.

T is the sour-milk-discharge pipe in the bottom of the pan, passing through the bottom of the tank, and rendered water-tight thereat by a packing, H.

The second part of my invention pertains to the construction of the pipe R, which is employed in deep pans and where a large quantity of milk is to be cooled. This pipe is immersed in the milk and extended nearly the length and partly across the pan and returned to bring the water-inlet and outlet at one end of the pan and at a distance from each other, so that the warmed water passing out of one will not effect that entering in the other. Both the inlet and outlet are vertical extensions of said pipe, one extending some distance above the pan and having a funnel for the reception of water at its upper extremity, and the other being bent over the top edge of the pan to form a spout for the discharge of the water.

Figure 4:
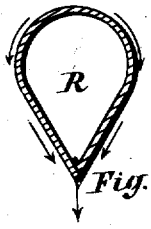

This class of cooling apparatus, although effective in their operation, have, on account of the difficulty of cleaning them, failed to come into extensive use. The difficulty laid mainly in the adherence to the pipe of the sour milk when being drawn off. This was attributable to the form of the pipe. Round pipes caused the sour milk to adhere to the bottom and triangular pipes caused it to lodge on top. To obviate this difficulty I construct the body of the pipe of a convex or segmental top and two tangential sides converging to an angle at the bottom, as best shown in Fig. 4 of the drawing. The sour milk, as it is drawn from the pan, through the discharge-pipe T, will flow freely from the convexed top of the pipe R down its convergent sides, and fall from the angular bottom, as indicated by arrows in Fig. 4 of the drawing, without leaving, comparatively, much, if any, deposit upon the same, so that very little labor is required to clean it. Besides this advantage, the pipe is easily manufactured and strong.

In order to brace the vertical extensions of the pipe R, before described, and to support the said pipe at that end of the pan without bringing the support in contact with the milk in the pan, and thus save the labor of cleaning it, and also avoid interference with the skimming of the milk, I employ a T-shaped bar, which with each end of its horizontal portion *r* engages the upper portion of one of the vertical extensions of the pipe R. The vertical limb *r'* of the T-shaped support is extended to the exterior of the water-tank B, and in a suitable manner secured thereat.

Having thus described my invention, what I claim as new, and desire to secure by Letters Patent, is—

1. The combination and arrangement with a milk-pan set within a water-pan, having a water-outlet underneath the milk-pan of a water-inlet, arranged around the exterior of the pan, at or near the top thereof, to apply the cold water first at the top of the pan, and uniformly on all sides, substantially as described.

2. The arrangement, with the milk-pan A within the tank B, and having a water-space around its sides and bottom, of the perforated pipe *p*, extended around the pan, inside the water-tank, at the top of its vertical sides, and the perforated pipe *d*, arranged longitudinally central underneath the pan, and having an exit through the end of the tank, substantially in the manner described and shown, for the purpose set forth.

3. The pipe R, when constructed of a convex or segmental top and two tangential sides converging to an angle at the bottom, substantially as described and shown, for the purpose specified.

4. The combination and arrangement of the tank B, pan A, pipe R, having isolated vertical extensions at one end of the pan, and a T-shaped bar engaging at each end of its horizontal portion *r*, one of the aforesaid vertical extensions of pipe, and having its vertical limb *r'* extended to the exterior of the tank B, all constructed and combined substantially in the manner specified and shown, for the purpose set forth.

In testimony whereof I have hereunto set my hand and seal this 14th day of May, 1877.

HENRY A. HANNUM. [L. S.]

Witnesses:
L. T. CARTER,
C. H. PAGE.